(12) United States Patent
Johnson et al.

(10) Patent No.: US 11,062,816 B2
(45) Date of Patent: Jul. 13, 2021

(54) TARGET, APPARATUS AND PROCESS FOR THE MANUFACTURE OF MOLYBDENUM-100 TARGETS

(71) Applicant: BEST THERATRONICS LTD., Ottawa (CA)

(72) Inventors: Richard Ray Johnson, Vancouver (CA); William Z. Gelbart, Vancouver (CA); Brian Abeysekera, Burnaby (CA); Lidia Matei, Saskatoon (CA); Glenn McRae, Ottawa (CA)

(73) Assignee: BEST THERATRONICS LTD.

( * ) Notice: Subject to any disclaimer, the term of this patent is extended or adjusted under 35 U.S.C. 154(b) by 696 days.

(21) Appl. No.: 15/502,338

(22) PCT Filed: Aug. 7, 2015

(86) PCT No.: PCT/CA2015/050751
§ 371 (c)(1),
(2) Date: Feb. 7, 2017

(87) PCT Pub. No.: WO2016/023113
PCT Pub. Date: Feb. 18, 2016

(65) Prior Publication Data
US 2017/0231080 A1    Aug. 10, 2017

Related U.S. Application Data

(60) Provisional application No. 62/035,589, filed on Aug. 11, 2014.

(51) Int. Cl.
*H05H 6/00*        (2006.01)
*G21G 1/00*        (2006.01)
(Continued)

(52) U.S. Cl.
CPC .......... *G21G 1/001* (2013.01); *B01D 5/0057* (2013.01); *B01D 7/00* (2013.01); *B01D 15/08* (2013.01);
(Continued)

(58) Field of Classification Search
CPC ............ G21G 1/001; G21G 1/02; G21G 1/10; G21G 2001/0042; H05H 6/00; H05H 1/28
See application file for complete search history.

(56) References Cited

U.S. PATENT DOCUMENTS 5,206,481 A * 4/1993 Rossner .................... H05H 1/28
                                                219/121.48
5,756,959 A * 5/1998 Freeman ................ B23K 10/00
                                                219/119
(Continued)

FOREIGN PATENT DOCUMENTS

WO    2012139220 A1    10/2012
WO    2014097269 A1    6/2014

OTHER PUBLICATIONS

Gelbart, William, Richard R. Johnson, and Brian Abeysekera. "Solid target irradiation and transfer system." AIP Conference Proceedings. vol. 1509. No. 1. AIP, 2012. available online: <https://aip.scitation.org/doi/pdf/10.1063/1.4773956?class=pdf>. (Year: 2012).*

(Continued)

*Primary Examiner* — Lily C Garner
(74) *Attorney, Agent, or Firm* — Barnes & Thornburg LLP

(57) ABSTRACT

Apparatuses and methods for production of molybdenum targets, and the formed molybdenum targets, used to produce Tc-99m are described. The target includes a copper support plate having a front face and a back face. The copper support plate desirably has dimensions of thickness of about 2.8 mm, a length of about 65 mm and a width of about 30 mm; and the copper support plate desirably has either a (Continued)

circular or an elliptical cavity centrally formed therein by pressing molybdenum powder into the front face with a depth of about 200-400 microns. Also, the copper support plate includes cooling channels dispensed at the back face; wherein the copper support plate is water cooled by a flow of water during irradiation by a proton beam. Molybdenum powder is embedded and compressed onto the cavity of the copper support plate thereby creating a thin layer of molybdenum onto the copper support plate.

33 Claims, 8 Drawing Sheets

(51) Int. Cl.
| | |
|---|---|
| *G21G 1/10* | (2006.01) |
| *B01D 5/00* | (2006.01) |
| *B01D 7/00* | (2006.01) |
| *B01D 15/08* | (2006.01) |
| *C01G 99/00* | (2010.01) |
| *G21G 1/02* | (2006.01) |
| *H05H 1/28* | (2006.01) |

(52) U.S. Cl.
CPC ......... *C01G 99/003* (2013.01); *C01G 99/006* (2013.01); *G21G 1/02* (2013.01); *G21G 1/10* (2013.01); *H05H 6/00* (2013.01); *C01P 2006/80* (2013.01); *G21G 2001/0042* (2013.01); *H05H 1/28* (2013.01)

(56) References Cited

U.S. PATENT DOCUMENTS

| | | | | |
|---|---|---|---|---|
| 7,470,872 | B2* | 12/2008 | Griffin | H05H 1/28 219/121.39 |
| 7,567,597 | B2* | 7/2009 | Groetsch | H01L 23/473 372/34 |
| 8,524,006 | B2* | 9/2013 | Uhland | G21G 1/10 134/3 |
| 9,114,475 | B2* | 8/2015 | Hollberg | H05H 1/34 |
| 9,661,731 | B2* | 5/2017 | Hollberg | H05H 1/28 |
| 2003/0218054 | A1* | 11/2003 | Koenigsmann | B23K 20/023 228/115 |
| 2004/0200810 | A1* | 10/2004 | Brandt | H05H 1/34 219/121.49 |
| 2006/0072698 | A1* | 4/2006 | Morgenstern | G21G 1/10 376/194 |
| 2010/0294655 | A1* | 11/2010 | Hong | H05H 6/00 204/298.09 |
| 2012/0248073 | A1* | 10/2012 | Conway | H05H 1/28 219/121.49 |
| 2013/0301769 | A1* | 11/2013 | Schaffer | B22F 1/0088 376/195 |
| 2014/0029710 | A1* | 1/2014 | Wilson | H05H 6/00 376/189 |
| 2015/0083695 | A1* | 3/2015 | Laurisch | H05H 1/34 219/121.49 |
| 2015/0102020 | A1* | 4/2015 | Hollberg | H05H 1/34 219/121.49 |
| 2017/0229202 | A1* | 8/2017 | Johnson | B01D 5/0057 |
| 2020/0195095 | A1* | 6/2020 | Yoo | B29C 39/10 |

OTHER PUBLICATIONS

Surette, Gabriel Joseph. Molybdenum-100 Targets for Cyclotron Production of Technetium-99m. Diss. Carleton University, 2015. (Year: 2015).*
Brooks, Hadley, and Kevin Brigden. "Design of conformal cooling layers with self-supporting lattices for additively manufactured tooling." Additive Manufacturing 11 (2016): 16-22. (Year: 2016).*
Hagari, Tomoko, and Katsuhiko Ishida. "Numerical investigation on flow and heat transfer in a lattice (matrix) cooling channel." Turbo Expo: Power for Land, Sea, and Air. vol. 55140. American Society of Mechanical Engineers, 2013. (Year: 2013).*
Kim, T., et al. "Convective heat dissipation with lattice-frame materials." Mechanics of Materials 36.8 (2004): 767-780. (Year: 2004).*
PCT Search Report and Written Opinion completed by the ISA/CA dated Sep. 22, 2015 and issued in connection with PCT/CA2015/050751.
Matei et al., "A new approach for manufacturing and processing targets used to produce 99mTc with cyclotrons," Conference Paper, ResearchGate, 8 pages, Aug. 2015.
Matei et al., "Molybdenum targets for production of 99mTc by a medical cyclotron," Abstract, 15th International Workshop on Targetry and Target Chemistry, Prague, Czech Republic, 2 pages, Aug. 18-21, 2014.
Matei et al., "Thermal separation of 99mTc from Molybdenum targets," Abstract, 15th International Workshop on Targetry and Target Chemistry, Prague, Czech Republic, 4 pages, Aug. 18-21, 2014.
Matei et al., "Molybdenum targets for production of 99mTc by a medical cyclotron," Poster, 15th International Workshop on Targetry and Target Chemistry, Prague, Czech Republic, 1 page, Aug. 18-21, 2014.
Matei et al., "Thermal separation of 99mTc from Molybdenum targets," Presentation, National Research Council, Ottawa, Canada, 26 pages, Aug. 12, 2014.
Matei et al., "Thermal separation of 99mTc from Molybdenum targets," Presentation, 15th International Workshop on Targetry and Target Chemistry, Prague, Czech Republic, 20 pages, Aug. 18-21, 2014.

* cited by examiner

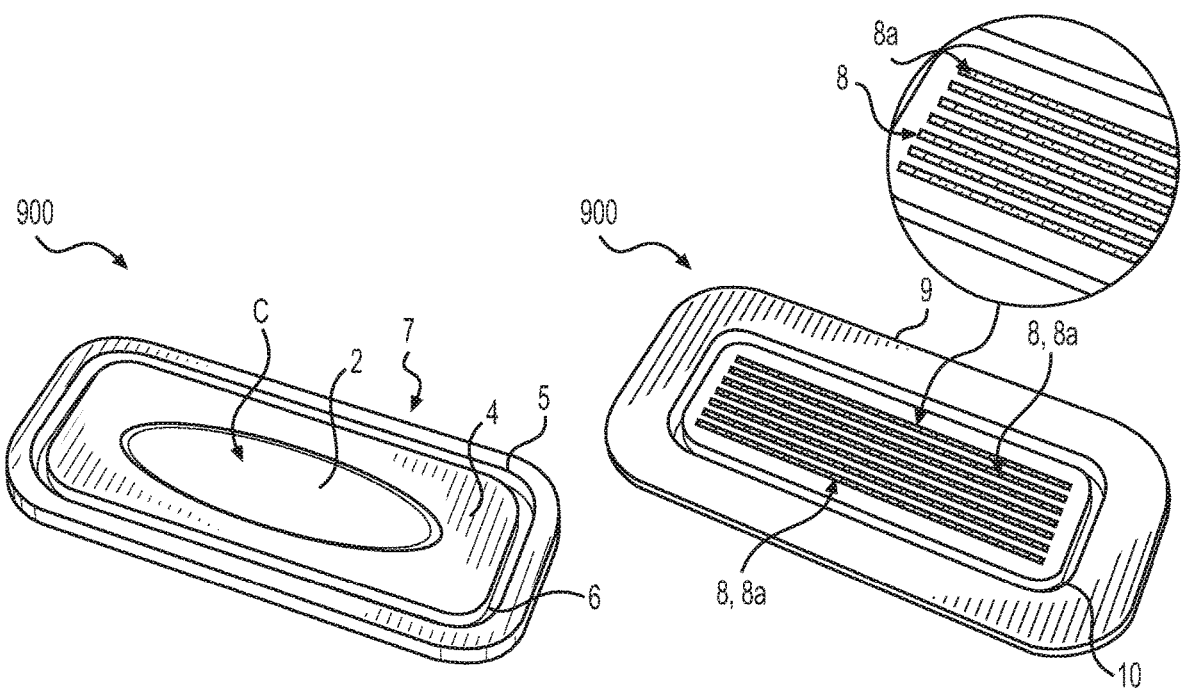
FIG. 9A  FIG. 9B
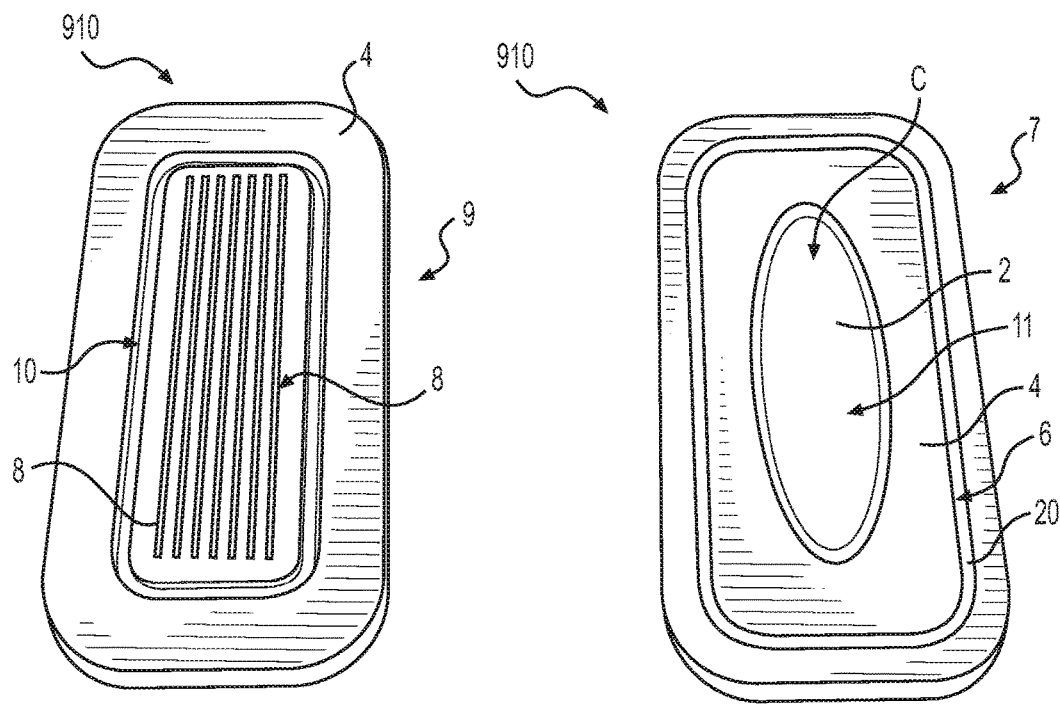
FIG. 9C  FIG. 9D

TARGET, APPARATUS AND PROCESS FOR THE MANUFACTURE OF MOLYBDENUM-100 TARGETS

CROSS REFERENCE TO RELATED APPLICATIONS

This application is a U.S. nationalization under 35 U.S.C. § 371 of International Application No. PCT/CA2015/050751, filed Aug. 7, 2015, which claims priority to U.S. Provisional Application Ser. No. 62/035,589, filed Aug. 11, 2014. The disclosures of PCT/CA2015/050751 and U.S. Ser. No. 62/035,589 are expressly incorporated by reference in their entirety.

FIELD OF THE INVENTION

The invention generally relates to the field of radioisotope production, and more particularly to molybdenum targets and methods and apparatuses to embed and bind molybdenum-100 powder as a uniform compact layer on a metallic support as a target for the production of Technetium-99m (Tc-99m) by cyclotrons.

BACKGROUND

Radioactive isotopes are widely used in medicine for diagnostic procedures. The most prominent of these radioisotopes is Molybdenum-99 (Mo-99) which is used as a precursor for Tc-99m. This latter isotope is used in more than 80% of nuclear imaging tests for detecting cancer, heart disease and other medical conditions. Each day, hospitals and clinics around the world use Mo-99/Tc-99m in more than 60,000 diagnostic procedures.

Tc-99m ($T_{1/2}$=6.02 hours (hrs.) is the most prevalent radioisotope used in nuclear medicine procedures for diagnosis of cancer and heart disease. It can be produced from natural radioactive decay of parent Mo-99 ($T_{1/2}$=66 hrs.), which is most often produced by fission of uranium in nuclear reactors. After several interruptions in the production of Mo-99 with nuclear reactors, alternative production routes for Tc-99m are being developed. The cyclotron production of Tc-99m involves the irradiation of solid targets enriched in Mo-100 with a beam of accelerated protons in a cyclotron. The highest probability for production of Tc-99m via a Mo-100 (p, 2n) nuclear reaction is when the energy of accelerated protons is in the range of 10 to 22 Megaelectronvolts (MeV). At energies greater than 22 MeV the production yield of Tc-99m decreases as other nuclear reaction channels are opened with production of a relatively high level of radionuclidic impurities. The production rate of Tc-99m via a 100Mo (p, 2n) nuclear reaction reaches the maximum value at the energy of 15 MeV. Tc-99m can be made in sufficient amounts for nuclear medicine applications directly with cyclotrons by irradiation of enriched Mo-100 solid targets at currents between 100 microamperes (μA) and 400 μA.

A variety of procedures have been studied for depositing molybdenum (Mo) powder on different metallic supports in order to develop large-scale production of enriched Mo-100 targets for routine production of Tc-99m by cyclotrons. From the industrial perspective, plasma spraying showed promising results initially, but the process was relatively expensive typically requiring customized equipment in order to reduce losses because of overspray, which also typically required a large inventory of expensive feedstock.

One example described in International Patent Application No. WO 2012/139220 is based on manufacturing of 6 millimeter (mm) to 9 mm diameter pellets by pressing Mo powder and then sintering it in a reducing atmosphere. The obtained pellet is then bound to a metallic support, the metallic support typically being one or more of the following metals: Al, Ag, Pt, Au, Ta, Ti, V, Ni, Zn, Zr, Nb, Ru, Rh, Pd and Ir. These pellets have been used for research purposes and typically are not suitable for large-scale production of Tc-99m because the quantity of Mo can only provide small amounts of Tc-99m, which is usually not enough for nuclear medicine applications which require tens of Curies per irradiation. The pellets manufactured by pressing as in the known art, however, typically cannot withstand high heat generated during irradiation with the high currents required to produce meaningful amounts of Tc-99m. In addition, the pellets are mechanically fragile and break easily. The pressed Mo powder must be sintered to increase its density by exposing it to heat of about 1,600 degrees Centigrade (° C.), which can be problematic because Mo reacts with small amounts of oxygen to form molybdenum trioxide ($MoO_3$). At temperatures above about 500° C. with a marked increase at about 650° C. the vaporization process of $MoO_3$ begins, thus special oxygen-free high-temperature ovens are required. The target manufacturing can be a lengthy process that requires expensive equipment and relatively many steps where losses of Mo-100 can occur, which can make routine production and quality assurance difficult.

Another approach to deposit molybdenum on targets is described in the US Patent Application Publication No. US 2013/0301769 A1. The disclosed process involves producing Mo targets by electrophoretic deposition of a porous layer of Mo on the target support plate. The process also includes a sintering step, with temperatures between 1,400° C. and 2,000° C. in an oxygen-free environment for up to 7 hours (hrs.) to make the Mo layer dense. The preferred target support is tantalum (Ta) because of its high melting temperature (>3000° C.), which is required for the support to survive the sintering step. However, tantalum has a low thermal conductivity coefficient of 57.5 $W \cdot m^{-1} K^{-1}$ Watts/(meterKelvin), so it is necessary that the support plates be thin, which makes them mechanically fragile, typically requiring special heat treatments to withstand the pressure of the cooling water on the back of the target support used during irradiation.

For the electrophoretic deposition, Mo-100 powder is typically suspended in a solution that includes a binder and a voltage drives an electrophoresis process to the target support acting as cathode. Prior to electrophoretic deposition, commercial Mo-100 powder must be reprocessed by oxidation and then reconverted to Mo metal by a three-step conversion process. The aim of the conversion process is to reduce the grain size of Mo powder in order to facilitate the electrophoretic process. The entire process to produce these targets is typically a time consuming process with Mo-100 losses during the process that are difficult to control. Additionally, the target geometry typically changes depending on the angle that the target makes relative to the proton beam. The target and the cooling design of the target, while appropriate to maintain the Mo at a temperature of at or below 500° C., is typically not sufficient because at a temperature higher than 319° C. there is volatilization of technetium oxides that are formed during irradiation because of the presence of trace oxygen in the system.

If the target material is held at a temperature higher than 319° C., then this typically leads to a volatilization loss of generated Tc-99m and, hence, a lower production yield.

Furthermore, volatilized technetium oxides produced during irradiation contaminate the target holder when they condense on colder surfaces which necessitates de-contamination of the target holder before it can be used again. In addition, at temperatures below about 500° C., molybdenum oxides can also be formed that volatilize and lead to Mo-100 loss from the target and deposition of Mo-100 on cold surfaces of the target holder.

While there have been some attempts to produce molybdenum targets, such attempts have not adequately addressed an efficient method and system to overcome the aforementioned drawbacks. It is therefore desirable to provide an efficient method and apparatus for producing Mo-100 targets. It is further desirable to provide a method for the production of Tc-99m radioisotopes using the Mo-100 targets.

Thus, a method of producing molybdenum-100 targets for cyclotron production of Technetium-99m addressing the aforementioned problems is desired.

SUMMARY OF INVENTION

Embodiments of methods and apparatuses for manufacturing molybdenum targets to be used in the production of Tc-99m with commercial cyclotrons and embodiments of the molybdenum targets produced thereby are described. The described methods provide a relatively low cost, reproducible, reliable and fast process for binding Mo powder on copper substrates to form cyclotron targets.

In an embodiment, a target for production of Tc-99m is described, which includes a target support plate including copper having a front face and a back face, the copper target support plate desirably having dimensions of thickness of about 2.8 millimeters (mm), a length of about 65 mm and a width of about 30 mm. The copper support plate desirably has a circular or an elliptical cavity formed by pressing a molybdenum material into the copper support plate, the cavity typically being at the center of the front face with a depth of about 50 micrometers ($\mu$m) to about 200 $\mu$m for embedding, or placing therein if the cavity is pre-formed, a molybdenum powder or a molybdenum pellet or disk, with a thickness of a formed thin substantially uniform layer of molybdenum having a thickness in a range of from about 50 microns to about 200 microns or to about 300 microns, for example, as can depend on the use or application; and the copper target support plate includes cooling channels dispensed at the back face, wherein the copper target support plate is water cooled by flow of water at a predetermined velocity during irradiation of the formed molybdenum target thereon by a proton beam.

In another embodiment, a method for manufacturing a target for the production of Tc-99m, includes embedding a molybdenum material into a copper target support plate in a cavity formed by pressing the molybdenum material into the copper target support plate, or the molybdenum material being placed therein if the cavity is pre-formed in the copper target support plate, the copper target support plate providing a physical support for the molybdenum material in the formed cavity; and applying a pressing force on the molybdenum material to embed the molybdenum material in the cavity on the copper target support plate to form a thin substantially uniform layer of the molybdenum material in the cavity on the copper target support plate or substrate to form a molybdenum target.

In a further embodiment, a method for manufacturing a target for the production of Tc-99m is described which includes embedding a molybdenum material, such as a thin substantially uniform layer, on a target support plate including copper, the target support plate providing a physical support for a molybdenum target to be formed from the molybdenum material; and applying a pressing force on the molybdenum material embedded on the target support plate to create a pressed thin layer of the molybdenum material on the target support plate forming the molybdenum target to form Tc-99m.

In an embodiment, a method for manufacturing a target for the production of Tc-99m is described which includes providing a target support plate including copper, the target support plate having a front face and a back face. A molybdenum material is placed in association with the front face of the target support plate. A pressing force is applied to the molybdenum material to embed the molybdenum material in a cavity formed in the front face by the pressing force, the cavity forming a target material receptacle for the molybdenum material, the pressing force creating a thin substantially uniform layer of the molybdenum material in the formed cavity of the target support plate to form a molybdenum target for forming Tc-99m.

In another embodiment, a process for the production of Tc-99m from a molybdenum target includes the steps of: providing a molybdenum target to be irradiated, irradiating the molybdenum target with a proton beam having an energy level to induce a Mo-100 (p, 2n) nuclear reaction, separating the irradiated molybdenum including the formed Technetium (Tc-99m) from the target support plate to form a separated irradiated molybdenum material; heating the irradiated molybdenum material of the molybdenum target separated from the copper target support plate or substrate to a temperature in a range of from about 300° C. to about 1,200° C., for example, to generate a vaporized compound containing Tc-99m, condensing the vaporized compound containing Tc-99m to form a reaction product; adding a dilute base to the condensed reaction product to form a solution containing pertechnetate ion Tc-99m [$TcO_4$]$^-$; collecting the condensed reaction product containing the solution of a pertechnetate ion Tc-99m [$TcO_4$]$^-$; and purifying the Tc-99m [$TcO_4$]$^-$ pertechnetate solution from the condensed reaction product to provide the Tc-99m as a radiochemical compound, such as sodium pertechnetate ($NaTcO_4$) as the radiochemical compound, using column chromatography.

In embodiments to form a molybdenum target, the molybdenum (Mo) powder is embedded or placed in a formed or pre-formed cavity on a copper target support plate as a uniform or substantially uniform layer with a mass of about 200 (milligrams) mg to about 400 mg and a surface area coverage of about 3 centimeters$^2$ (cm$^2$).

In another embodiment to form a molybdenum target, the copper target support plate is passivated with a noble metal protective layer. The protective layer can be, but is not limited, to Gold (Au), Platinum (Pt), Iridium (Ir), Osmium (Os), Rhodium (Rh), Nickel (Ni), or a combination thereof. The protective layer is uniform or substantially uniform and deposited with a thickness of about 3 microns ($\mu$m) to about 5 $\mu$m, for example.

In another embodiment to form a molybdenum target, the molybdenum material, such as Mo powder, is pressed into the copper target support plate or substrate, the pressing forming a target material receptacle of a predetermined shape including a cavity to receive the molybdenum material, by applying a force of about 125 kiloNewtons (kN) to about 400 kN, for example, using a hardened steel die and a corresponding washer and retaining plate assembly.

These and other features of the present invention will become readily apparent upon further review of the following specification and drawings.

DESCRIPTION OF THE DRAWINGS

FIG. 9A and FIG. 9B show perspective front and back views respectively of an exemplary molybdenum target support plate for forming a molybdenum target, with the front view of FIG. 9A illustrating a formed molybdenum target, according to the present invention.

FIG. 9C shows a perspective bottom view of a back face of another exemplary molybdenum target support plate for forming a molybdenum target, which shows the cooling channels and an O-ring groove on an exemplary copper target support plate according to the present invention.

FIG. 9D shows a perspective top view of a front face of the molybdenum target plate of FIG. 9C with a molybdenum material embedded in a formed cavity on a gold plated copper support plate with an O-ring placed in association with an O-ring groove according to the present invention.

Unless otherwise indicated, similar reference characters denote corresponding features consistently throughout the attached drawings.

DETAILED DESCRIPTION

Figure 1:
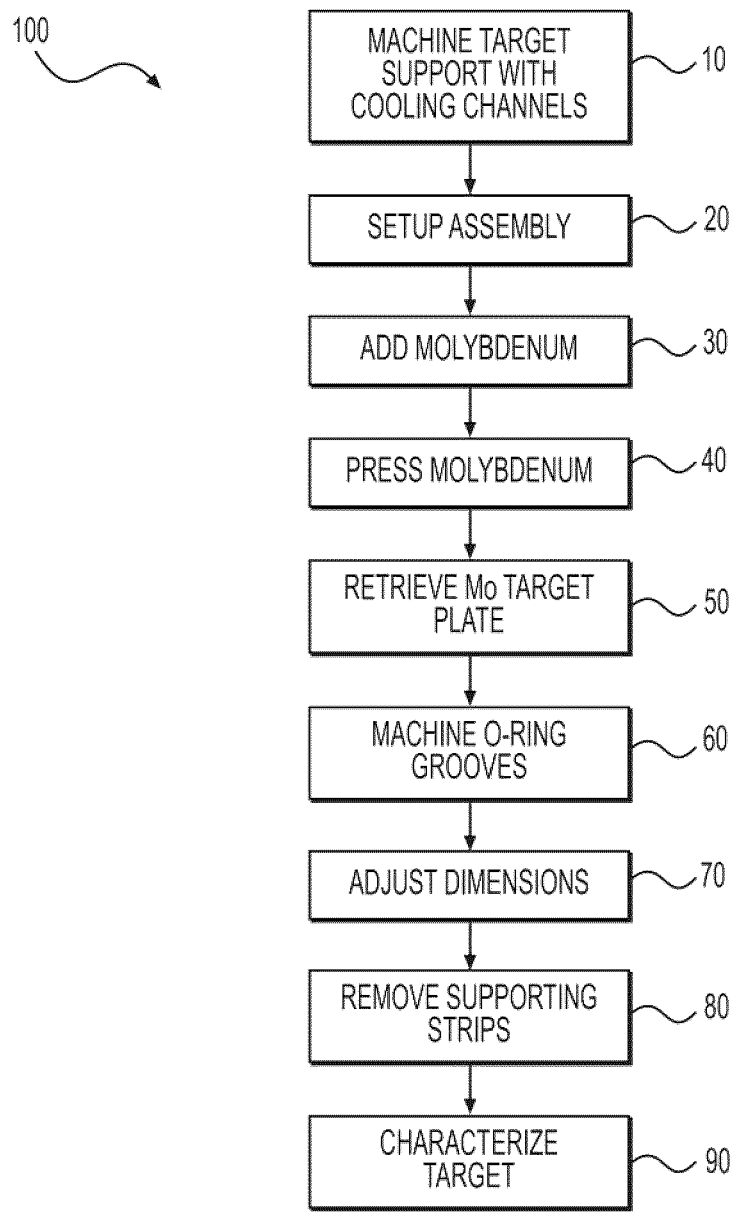
FIG. 1 is a schematic flow chart of an exemplary process of preparing a molybdenum target according to the present invention.

The disclosure relates to apparatuses and methods for the production of molybdenum targets for the production of technetium Tc-99m. The most promising alternative methods for production of Tc-99m involve accelerators that focus Bremsstrahlung radiation or protons on targets including metallic Mo-100 on a metallic support used to conduct heat away during irradiation. The nuclear reaction of Mo-100 (p, 2n) Tc-99m provides a direct route that can desirably be incorporated into routine production of Tc-99m in regional nuclear medicine centers having medical cyclotrons for production of isotopes, such as those used for Positron Emission Tomography (PET).

Targets used to produce Tc-99m are typically subject to a number of operational constraints. They must withstand the temperatures generated during irradiation and be fashioned to accommodate temperature gradients from in situ cooling. High production yields for such Tc-99m typically require high currents, which generate high temperatures; and the target temperature during irradiation typically must be kept below softening temperatures of the metallic components and below temperatures where any molybdenum oxides or technetium oxides might sublime. The targets must be resilient and should not substantially disintegrate during irradiation or post processing, because of the radioactive nature of the products. Another factor for consideration in producing a molybdenum target is that the quantity of Mo-100 deposited on the Cu should be controllable and selectively adjustable to accommodate manufacture of molybdenum targets that are optimized for cyclotrons of different energies. The exemplary disclosed targets in the accompanying figures were designed for a high-volume production of Tc-99m with 15 Megaelectron-Volts (MeV), desirably the energy being greater than about 10 MeV, and incident protons at currents of about 400 microAmperes (μA) with about 15% collimation, for example, but can be designed to be suitable for various applications, and should not be construed in a limiting sense. An optimal quantity of Mo-100 deposited in forming such target is about 62 milligrams/centimeters$^2$ (mg/cm$^2$) for metallic Mo-100 in the form of a 10 millimeter (mm)×38 mm ellipse with its major axis at an angle of about 15° relative to a proton beam with a 10 mm diameter, such as the molybdenum target being exposed to a proton beam generated by a cyclotron at grazing incidence of about 15° (incident angle to the normal of 75°) and in the plane that includes the normal and the elliptical target major axis. The larger area associated with the elliptical shape can provide relatively better cooling when compared with circularly-shaped targets used for normal incident irradiation by reducing the heat flux associated with high current sources. The exemplary molybdenum targets have also been manufactured for irradiation using a general-purpose target holder designed to be attached to and used with various makes of cyclotrons found in regional nuclear medicine centers.

An embodiment for manufacturing targets for the production of Tc-99m can include placing a molybdenum material in a pre-formed cavity on a copper target support plate, or desirably can include embedding a molybdenum material into a copper target support plate by pressing the molybdenum material into a copper target support plate forming a target material receptacle including a cavity to embed the molybdenum material in the formed cavity, the copper target support plate providing a physical support for the molybdenum material, and applying a pressing force on the molybdenum material placed in a pre-formed cavity or to form a cavity in the copper target support plate and to embed the molybdenum material in the formed cavity to form a thin layer of molybdenum material on the copper target support plate providing the physical support for the molybdenum material to form a molybdenum target. In one exemplary method, the molybdenum is dispensed as molybdenum metal powder, for example.

For example, in exemplary embodiments, the molybdenum material, such as a molybdenum metal powder, is dispensed as a uniform or substantially uniform layer that is placed in a pre-formed cavity on the copper target support plate, or the molybdenum material can be desirably embedded in the copper target support plate or substrate in a cavity of a target material receptacle of a predetermined shape formed by pressing the molybdenum material into the copper target support plate or substrate. Referring now to FIG. 1, an exemplary process 100 for manufacturing molybdenum targets is illustrated. The exemplary process 100 includes various steps including machining a copper support plate (step 10), which can include machining the cooling channels and filling these channels with a suitable filling material, such as desirably aluminum strips; setting up the molybdenum pressing assembly (step 20); adding molybdenum powder to an aperture associated with a retaining plate of a pressing assembly placed on the copper target support plate, or if the cavity of a target material receptacle is pre-formed on the copper target support plate, adding or placing the molybdenum material into the pre-formed cavity of a target material receptacle on the copper target support plate (step 30); desirably pressing the molybdenum material placed in the aperture associated with the retaining plate into the copper target support plate to form a cavity of a target material receptacle in the copper target support plate and to embed the molybdenum material in the formed cavity to form a molybdenum target, or if the cavity is pre-formed on the copper target support plate, pressing the molybdenum material placed in the cavity to form a molybdenum target (step 40); retrieving the molybdenum target plate (step 50); machining O-ring grooves on the copper support plate (step 60); adjusting the dimensions of the molybdenum target (step 70); removing the supporting strips from the formed molybdenum target (step 80); and characterizing the formed molybdenum target for use (step 90). Also, the machining of a copper support plate (step 10) to form cooling channels thereon can be performed after pressing the molybdenum material in the formed cavity to form the molybdenum target (step 40), for example, as can depend on the use of application, and should not be construed in a limiting sense.

In this regard, in the exemplary process, the manufactured molybdenum target(s) is/are dimensionally adjusted to fit in a solid target holder designed to accommodate target support plates desirably with a thickness of about 2.8 mm to about 3.2 mm, and a length of about 65 mm and width of about 30 mm, for example, but should not be construed in a limiting sense, as other suitable accommodations and corresponding target support plate dimensions are possible, as can depend on the use or application. The material used for the exemplary target support plates was desirably C101 copper sheet (oxygen free). In the process, the fabricated copper target support plates are transferred to the production unit including the pressing assembly (step 40). The molybdenum material, such as the Mo powder, can be dispensed in a pre-determined quantity into the pressing assembly and then embedded in a cavity formed by pressing the molybdenum material into the target support plate, and the molybdenum material can then be pressed by the pressing assembly (step 40). The amount of molybdenum used for a target is calculated or determined, for example, as a function of the range of protons in the material considering the amount of energy to be absorbed in the target material. The areal density (mg/cm$^2$) is calculated or determined for a given incidence of the proton beam to the target material and as a function of the density of Mo-100 (10.2 mg/cm$^3$), for example. An example of a calculated approximate amount of Mo to form an exemplary target is provided in Table 1 below. Table 1 provides, for example, a listing of a calculated or determined amount of Mo estimated according to different energies of protons in forming a suitable molybdenum target for producing Tc-99m.

TABLE 1

| Energy loss in target material (MeV) | Areal density for grazing incidence of 15° (mg/cm$^2$) | Approximate amount of Mo on an elliptically shape target (mg) |
|---|---|---|
| 15→11 (4) | 51 | 152 |
| 16.5→11 (5.5) | 73 | 217 |
| 18→11 (7) | 97 | 287 |

Figure 2A:
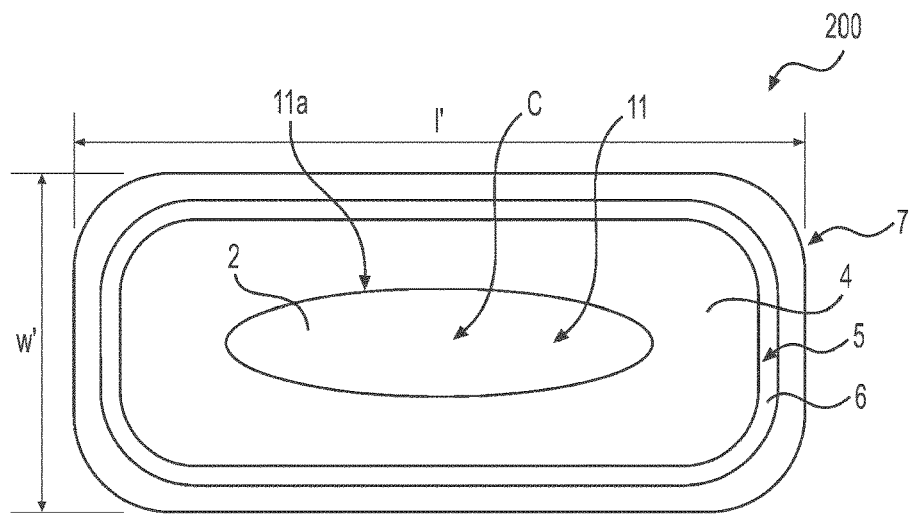
FIG. 2A is a top view illustrating a front face of an exemplary molybdenum target having an elliptical configuration according to the present invention.
Figure 3:
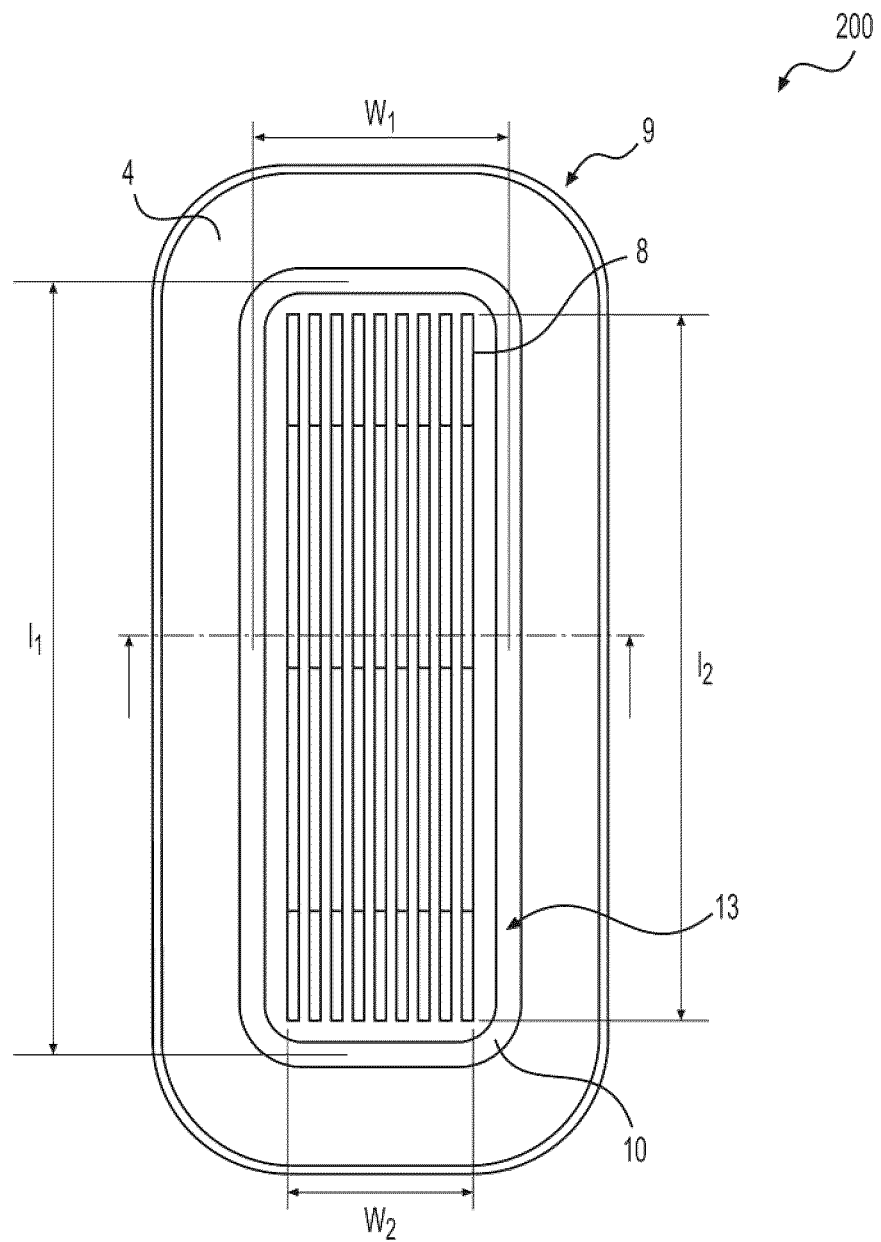
FIG. 3 shows a bottom view illustrating a back face of an exemplary copper target plate showing the cooling channels according to the present invention.

Copper has been chosen as a desirable material for forming a target support plate because of its relatively good thermal properties, which makes it an ideal or very suitable material for heat transfer during irradiation. Copper is a ductile material and is suitable for relatively easy machining. Referring now to FIGS. 2A and 3, a target apparatus 200 for a molybdenum target 11 is illustrated, the target apparatus 200 includes a target support plate 4, such as of Cu 101, that is equipped with a sealing O-ring groove 6 adapted to receive a suitable O-ring 5 placed on the front face 7 of the target support plate 4 and a sealing O-ring groove 10 adapted to receive a suitable O-ring 13 on a back face 9 of the target support plate 4 (FIG. 3). Typical dimensions for the target support plate 4, as shown in FIG. 2A are typically in a range of from about 50 mm to about 100 mm in length and a width (or breadth) in a range of from about 20 mm to about 50 mm, desirably about 65 mm in length (1') by about 30 mm in width (or breadth) (w'), for example, but the dimensions can depend on the particular use or application and should not be construed in a limiting sense.

Figure 2B:
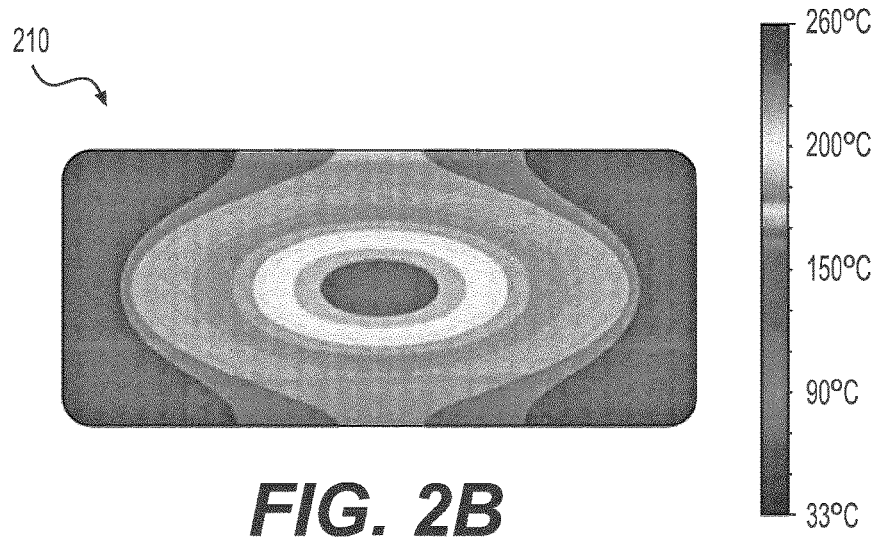
FIG. 2B shows the temperature distribution in the molybdenum target and in the target support plate for an elliptical molybdenum target at 6 (kiloWatts) kW irradiation power and a coolant flow rate of 8 Liters/minute (L/min).
Figure 2C:
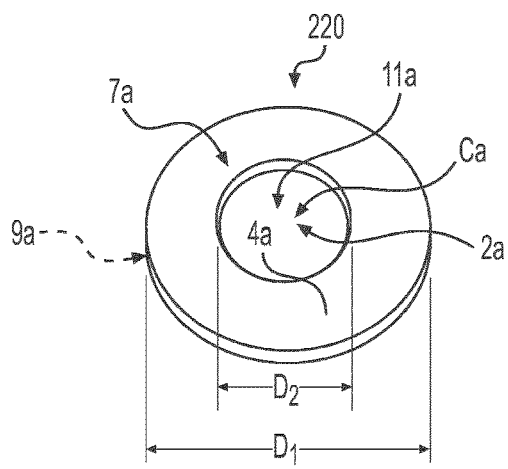
FIG. 2C is a top perspective view illustrating a front face of an exemplary molybdenum target and target support plate having a circular configuration according to the present invention.

A molybdenum material to form the molybdenum target 11 can be placed into a target material receptacle 2, such as a formed or a pre-formed cavity indicated by the reference letter "C" in the target support plate 4, for example. Desirably, the molybdenum material is added to or placed in an aperture associated with a retaining plate of a pressing assembly that is placed on the target support plate 4; and the pressing of the molybdenum material into the target support plate 4 forms the cavity C of the target material receptacle 2 in which the molybdenum material is embedded, such as described herein in relation to FIGS. 5, 6A, 6B, 7 and 8. The target material receptacle 2 and the cavity C, or a target material receptacle 2a and a cavity "Ca" of FIG. 2C, as can be similarly formed or pre-formed in a target support plate 4a as the cavity C of the target material receptacle 2, and can be of various suitable geometries, shapes, dimensions and sizes, such as of a generally elliptical shape, such as illustrated in FIG. 2A, or such as a generally circular shape as illustrated in FIG. 2C, as can depend on the use or application, and should not be construed in a limiting sense. The formed thin substantially uniform or uniform layer of molybdenum material of the target 11 in the cavity C, the cavity C being either pre-formed or being desirably formed by the pressing assembly in embedding the molybdenum material into the target support plate 4, and of a target 11a in the cavity Ca, the cavity Ca being either pre-formed or being desirably formed by the pressing assembly in embedding the molybdenum material into the target support plate 4a, likewise has a corresponding generally elliptical or generally circular shape, or other suitable corresponding shape, as can depend on the use or application, for example.

Desirably, the target support plate 4, such as includes copper, has a depth in a range of from about 200 microns to about 400 microns for placing or embedding a molybdenum material, such as a material including a molybdenum powder or a molybdenum pellet or disk, into a formed or pre-formed cavity C of the target material receptacle 2 in the target support plate 4, as described, for example, but the desired depth can depend on the particular use or application and should not be construed in a limiting sense. Prior to irradiation of the molybdenum target 11, the O-ring 5 is placed in association with the O-ring groove 6 and seals the target face 11 on a target holder during irradiation to form Tc-99m. Then, the exemplary Mo-100 material is exposed to a beam of accelerated protons of a suitable energy level and the back face 9 to a flow of a cooling fluid, such as a cooling water flow, the O-ring 13 being placed in association with the O-ring groove 10 adapted to seal the back face 9 and to seal one or more cooling channels 8 adapted to receive a cooling fluid, such as water, to cool the target support plate 4 that includes the target 11 (FIG. 3). The O-rings, such as the O-rings 5 and 13, and the O-ring grooves, such as the O-ring grooves 6 and 10, can be of any of various shapes, dimensions and sizes, as can depend on the use or application, and should not be construed in a limiting sense.

Referring now to FIG. 2C, an embodiment of a target apparatus 220 for the molybdenum target 11a is illustrated, the target apparatus 220 includes a target support plate 4a, such as of Cu 101, of a generally circular configuration and having a front face 7a and a back face 9a. A molybdenum material to form the molybdenum target 11a can be placed into the target material receptacle 2a, such as formed by a pre-formed generally circular cavity Ca on a front face 7a of the target support plate 4a, for example. Desirably, the molybdenum material is added to or placed in an aperture associated with a retaining plate of a pressing assembly that is placed on the target support plate 4a; and the pressing of the molybdenum material into the target support plate 4a forms the cavity Ca of the target material receptacle 2a in which the molybdenum material is embedded, such as described herein in relation to FIGS. 5, 6A, 6B, 7 and 8.

The target material receptacle 2a and the cavity Ca while illustrated as being generally circular in shape can be of various suitable geometries, shapes, dimensions and sizes, such as of a generally elliptical shape, such as illustrated in FIG. 2A, or a generally circular shape, such as illustrated in FIG. 2C, as can depend on the use or application, and should not be construed in a limiting sense. Typical dimensions of the generally circular target support plate 4a can be about 24 mm for an outer diameter ($D_1$) of the target support plate 4a and can be about 9 mm for an inner diameter ($D_2$) for the target material receptacle 2a for the target 11a, and the target support plate 4a can have a thickness of about 1.6 millimeters, for example, but the dimensions can depend on the particular use or application and should not be construed in a limiting sense. Desirably, the target material receptacle 2a including the cavity Ca, as can be either pre-formed in or formed by pressing to embed a molybdenum material into the target support plate 4a, can have a depth in a suitable range, such as can have an exemplary depth of about 230 microns, for placing or embedding a molybdenum material, such as a material including a molybdenum powder or a molybdenum pellet or disk, in or into the pre-formed or formed cavity Ca of the target material receptacle 2a, for example, but the desired depth can depend on the particular use or application and should not be construed in a limiting sense. Also, given the typically relatively smaller size of a circular target apparatus, such as the target apparatus 220, one or more cooling channels, similar to those illustrated in FIG. 3, as well as O-rings and O-ring grooves, similar to those in FIGS. 2A and 3, as described, are not typically used in conjunction with such circular target apparatus, such as the target apparatus 220.

An exemplary geometry of the one or more cooling channels 8 is shown in FIG. 3. The cooling channels 8 are of a suitable geometry, such as a suitable size, shape, arrangement and number to dissipate the heat generated by the irradiation of the molybdenum target 11, such as the heat generated by a power of about 6 kW, without typically a need for additional cooling with helium of the front face 7 of the target 11 (molybdenum face). Desirably a plurality of cooling channels 8 are formed, such as the plurality of generally rectangular shaped cooling channels 8 arranged in a generally parallel, spaced apart relation, as shown in FIG. 3, for example. As shown in FIG. 2B, there is illustrated a thermal simulation of a temperature distribution 210 of the generated heat in the target support plate 4 and in the molybdenum target 11 thereon, corresponding to the temperature scale in FIG. 2B in ° C. As illustrated in FIG. 2B, the temperature distribution on the target support plate 4 typically varies centrally outward from a maximum temperature of desirably about 260° C. to a cooler surface temperature at the outer portions of the target support plate 4, such as for an elliptical target, such as can be used as the molybdenum target 11, and it typically is desirable to maintain such surface temperature below about 300° C. for most applications, for example.

Also, the cooling fluid, such as water, when flowing in the cooling channels 8, such as during irradiation of the molybdenum target 11, can desirably enable the temperature of the target support plate 4 to be held at a temperature of less than about 300° C., for example. Such generated heat results from exposing the molybdenum target 11 to a beam of accelerated protons generating a power of 6 kW, for example, during irradiation of the molybdenum target 11, with the beam of accelerated protons including protons deposited in the molybdenum target 11 and cooled by a suitable cooling fluid, such as water, flowing through the cooling channels 8 at a coolant flow rate of from about 8 L/min to about 10 L/min, for example, as can depend on the cooling fluid used, such as water, and the use or application, and should not be construed in a limiting sense. Typical dimensions for an area for the cooling channels 8 are about 44.8 mm in length ($l_2$) by about 11.9 mm in width ($w_2$), for example. Also, typical dimensions of an area inclusive of the sealing O-ring groove 10 are about 49.6 mm in length ($l_1$) by 16.6 mm in width ($w_1$), for example.

As shown in FIG. 3, the target support plate back face 9 is designed with the sealing O-ring groove 10 adapted to be associated with a suitable second O-ring 13 so as to seal the cooling channels 8 which will receive the cooling fluid, such as water, to cool the target support plate 4 including the target 11, with a cooling fluid, such as water. The cooling fluid, such as water, desirably flows in the one or more cooling channels 8 at a predetermined or selected velocity, such as from about 8 L/min to about 10 L/min, for example.

Figure 4A:
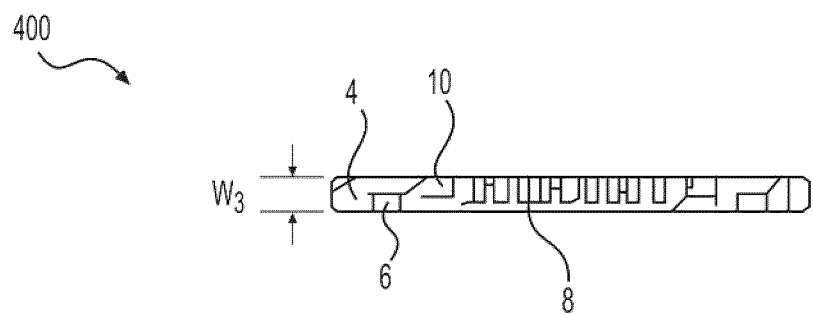
FIG. 4A shows a transverse sectional view and FIG. 4B shows a longitudinal cross-sectional view of a target support plate illustrating an example of a geometry and an arrangement of cooling channels on a target support plate according to the present invention.
Figure 4B:
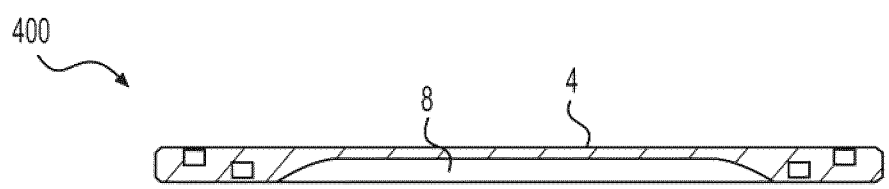

FIGS. 4A and 4B show a side view of a geometry 400 of the cooling channels 8 which can provide an appropriate or suitable laminar or turbulent flow of the cooling fluid, such as water, to reduce the temperature of the molybdenum target support plate 4 to about 290° C., desirably to about 260° C., during irradiation of the molybdenum target 11 such that the heat generated by irradiation, such as 6 kW of power, is distributed over the molybdenum target 11. The transverse and longitudinal cross sections of the cooling channels 8 are respectively shown in FIGS. 4A and 4B. The cooling channels 8 can be desirably arranged in a longitudinal direction or a perpendicular direction, such as relative to the length of the target support plate 4, such as illustrated in FIGS. 3, 4A and 4B, for example. However, the dimensions, shape, geometry and size of the cooling channels 8 can depend on the particular use or application, and should not be construed in a limiting sense. The sealing O-ring grooves 6 and 10 are respectively formed in and illustrated for the front face 7 and the back face 9 of the target support plate 4. The thickness of the molybdenum material forming the target 11 typically can be in a range of about 50 microns to about 200 microns or can be in a range of 60 microns to 80 microns, desirably about 200 microns for the circular target configuration and desirably about 60 microns for the elliptical target configuration, for example, but can depend on the particular use or application, and should not be construed in a limiting sense. Also, typical dimensions for the target support plate 4 can be in a range of from about 2 mm to about 4 mm in thickness, desirably a depth of the thickness of target support plate 4 is about 2.8 mm ($w_3$), for example, as illustrated in FIG. 4A. However, the dimensions, shape, geometry and size of the target support plate 4 can depend on the particular use or application, and should not be construed in a limiting sense.

In another exemplary embodiment, the cooling channels 8 are machined before the application, placement, or embedding of the target molybdenum material in the pre-formed or formed cavity C of target material receptacle 2 and are seated in a negative metallic image of the cooling channels 8 and the O-ring grooves 6 and 10 so that the cooling channels 8 and the O-ring grooves 6 and 10 are protected during target preparation.

In an exemplary embodiment, the cooling channels 8 and O-ring grooves 6 and 10 are formed, such as by being machined, before applying or embedding the target molybdenum material in the formed or pre-formed cavity C of the target material receptacle 2 and are protected during target preparation by a suitable material elastic enough to absorb the pressure applied during the manufacturing but hard enough to support the geometry of the cooling channels 8, such suitable elastic material can depend on the use or application, and should not be construed in a limiting sense.

For example, in an exemplary embodiment, the cooling channels 8 are filled desirably with aluminum strips or a supporting material including aluminum, or other suitable material, which can assist in maintaining the integrity of the cooling channels 8 during the pressing force applied to or in forming the molybdenum target 11. After pressing, the O-ring grooves 6 and 10 are machined into the target support plate 4, such as a copper substrate, and the copper substrate is machined to desired dimensions. The aluminum metal supporting the cooling channels is removed by immersion in diluted acid, such as hydrochloric acid, until the aluminum insertion sheets can be relatively easily removed from the cooling channels 8, for example.

Figure 5:
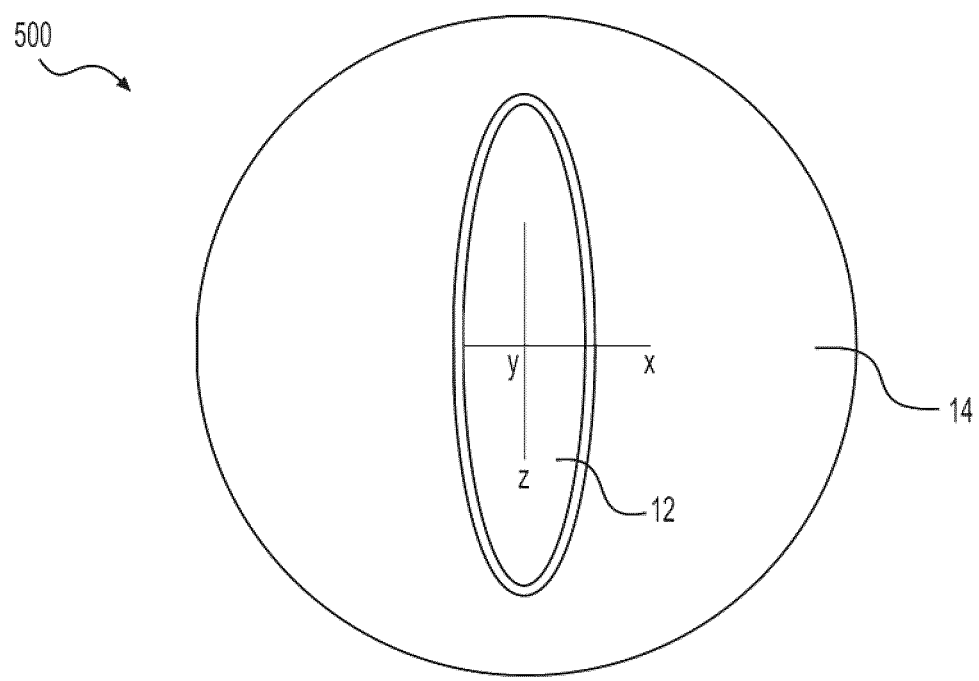
FIG. 5 is a plan view of a pressing die for pressing the molybdenum to form a molybdenum target according to the present invention.
Figure 6A:
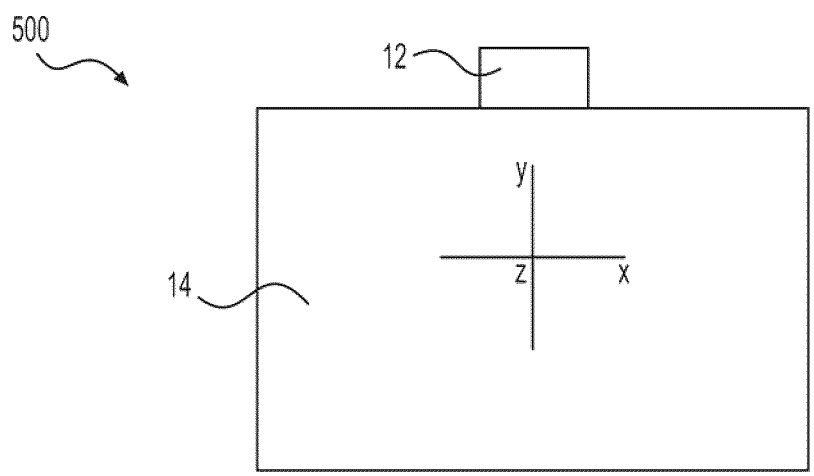
FIG. 6A and FIG. 6B respectively show side views of the pressing die of FIG. 5 for pressing molybdenum according to the present invention.
Figure 6B:
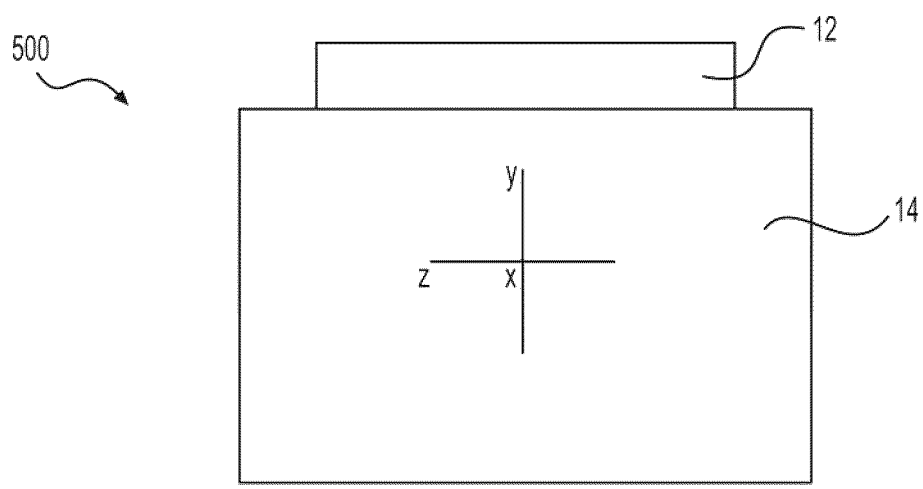
Figure 7:
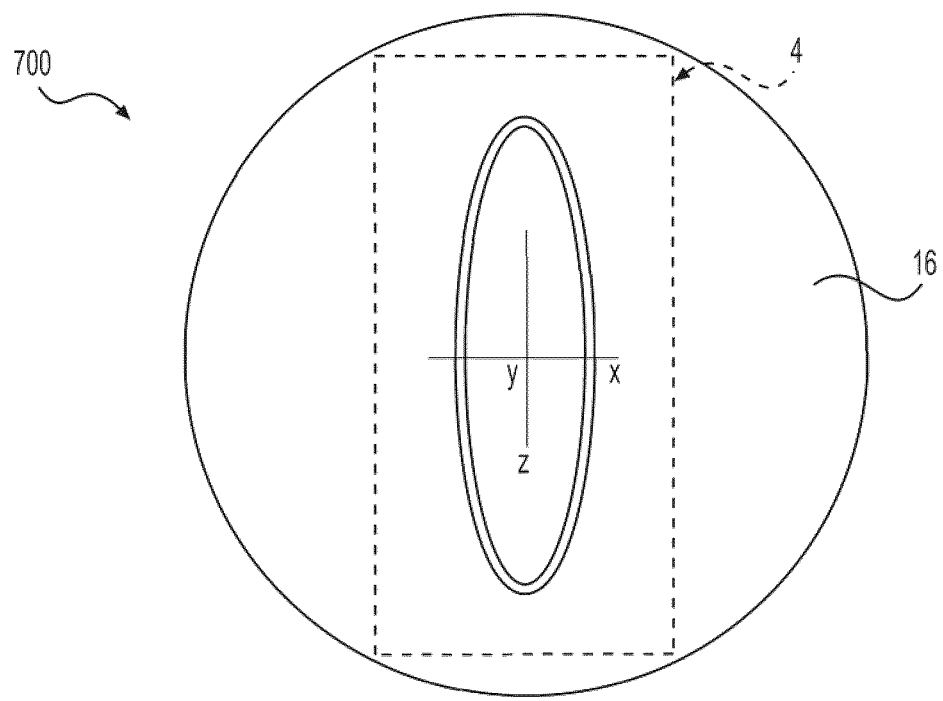
FIG. 7 shows a plan view of a pressing washer of the pressing die of FIG. 5 to form a molybdenum target according to the present invention.

In one embodiment, the copper plate or substrate forming the target support plate 4 is loaded onto a setup assembly including a suitable die for pressing molybdenum material, such as the molybdenum powder. Referring to FIG. 5, an exemplary die 500 is illustrated that has a cylindrical body 14 with a height of about 34 mm and a diameter of about 52 mm, for example. The exemplary die 500 is manufactured from hardened steel, for example, but can be manufactured of other suitable materials, as can depend on the use or application, and should not be construed in a limiting sense. As shown in FIGS. 6A and 6B, the exemplary die 500 also includes a protrusion 12, such as an elliptical shaped protrusion of about 3.5 mm, and the elliptical shaped protrusion can have a semi-axis length of about 10 mm and a major axis length of about 38 mm, for example, as can depend on the use or application. The protrusion 12 can be of any of various suitable shapes, such as can include an elliptical shaped protrusion and a circular shaped protrusion, as can depend on the use or application, and should not be construed in a limiting sense. In another embodiment, as illustrated in FIG. 7, the target support plate 4 is placed on an exemplary cylindrical opposite die 700, such as can be formed from hardened steel or other suitable material, for example, which will hold the target support plate 4 during the forming process. The cylindrical opposite die 700 can have a target retaining plate 16, such as a cylindrical retaining plate. The target retaining plate 16 can have a negative image of the exemplary cooling channels 8 and sealing O-ring grooves 10, for example.

In another embodiment, the retaining plate 16 can be covered with a suitable elastic material, as exemplified and previously described, such as with reference to FIGS. 3, 4A and 4B. In another embodiment, the retaining plate 16 does not necessarily need to have a negative image of the cooling channels 8, as can depend on the use or application, and should not be construed in a limiting sense.

Figure 8:
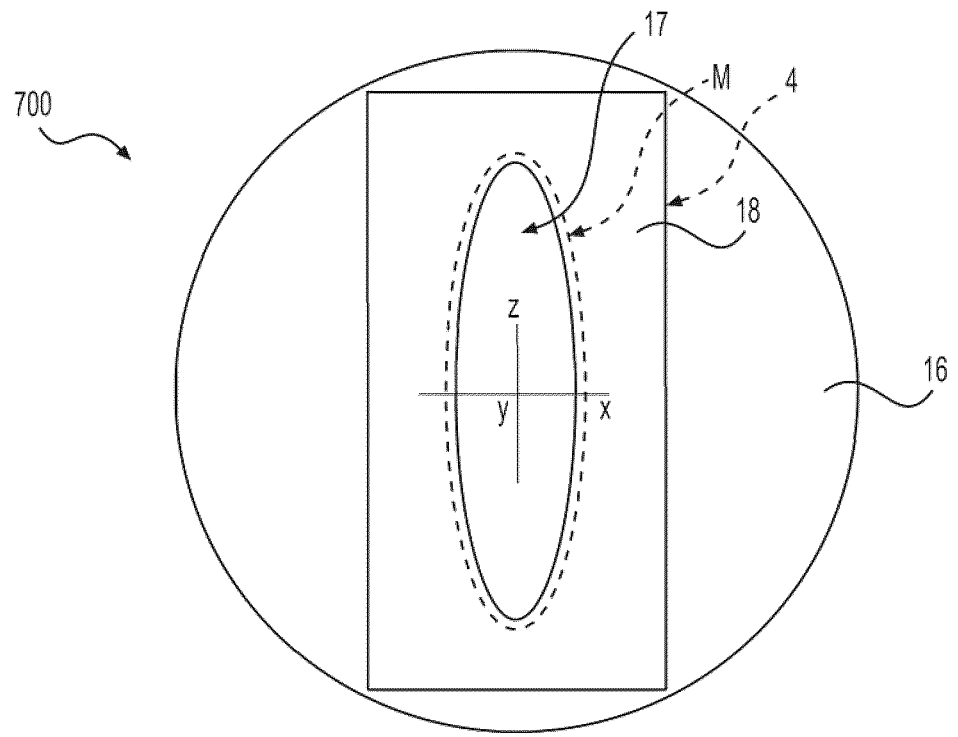
FIG. 8 shows a plan view of a washer and a retaining plate assembly to form a molybdenum target according to the present invention.

Referring now to FIG. 8, the exemplary assembly of the cylindrical opposite die 700 includes an exemplary molybdenum retaining washer 18. The molybdenum retaining washer 18 can have a generally rectangular shape of about a 50 mm length, about a 25 mm width and about a 3 mm thickness, for example, but the shape and dimensions of the molybdenum retaining washer 18 can depend on the use or application, and should not be construed in a limiting sense. The molybdenum retaining washer 18 can include an aperture 17, such as an aperture of a generally elliptical shape, that matches or substantially matches the protrusion 12, such as an elliptical protrusion, on the die 500 described in FIGS. 5, 6A and 6B so that the die 500 can travel through the molybdenum retaining washer 18 during the pressing process so as to press the molybdenum material in a pre-formed cavity C or Ca in the target support plate 4 or 4a or so as to embed the molybdenum material, indicated by the reference letter "M" in FIG. 8, placed in the aperture 17 of the molybdenum retaining washer 18 into the target support plate 4 or 4a into the cavity C or Ca formed by pressing the molybdenum material M into the target support plate 4 or 4a, for example. The molybdenum retaining washer 18 can be manufactured from various types of steel or other suitable material, as can depend on the use or application, and should not be construed in limiting sense.

In an exemplary embodiment, the calculated or determined amount of the molybdenum material M, such as the molybdenum powder, is dispensed in an even layer into the aperture 17 of the molybdenum retaining washer 18. The molybdenum material M, such as the molybdenum powder, desirably has a granulation of between about 3 μm to about 10 μm or from about 10 μm to about 20 μm, for example. The mass of the target molybdenum powder is calculated or determined depending on irradiation parameters. For example, for the exemplary target 11, the proton beam incident energy is about 15 MeV, and a target orientation is about 15° relative to the proton beam, as previously described. Also, the mass per area of the molybdenum layer appropriate for absorption of 15→10 MeV in the target molybdenum is about 62 mg/cm², and the current is typically in the range of 50 μA to 400 μA, for example.

In another embodiment, the molybdenum material, such as the molybdenum powder, used to form the molybdenum target 11 can be replaced by a mixture of molybdenum powder and a powder of another suitable metal to form a target with higher heat conductivity, for example.

In the pressing process to form the molybdenum target 11, after placing or dispensing the molybdenum material M, such as the molybdenum powder or a mixture including molybdenum powder, in the aperture 17 of the molybdenum retaining washer 18, a pressing force is applied by the protrusion 12 of the exemplary die 500 to embed the molybdenum material M into the target support substrate 4 and form the cavity C by the applied pressing force, for example. The pressing force applied desirably applies a uniform or substantially uniform compression, such as is applied by the protrusion 12 of the exemplary die 500 pressing through the aperture 17 in the molybdenum retaining washer 18, so that the molybdenum material M, such as the molybdenum powder, or mixture thereof, is pressed into the target support plate 4 that is desirably positioned on the target retaining plate 16 between the target retaining plate 16 and the molybdenum retaining washer 18 thereby creating the cavity C in the underlying copper support plate 4 and creating in the formed cavity C desirably a uniform or substantially uniform thin layer of molybdenum material fixed to the copper support plate 4 as the molybdenum target 11.

In one embodiment, the applied force pressing on the molybdenum powder typically can be between in a range of about 100 kN to about 500 kN, such as for an elliptical shaped target 11 having a surface area of about 3 cm², and desirably can be in a range of about 300 kN about 500 kN, for example. A typical force used for manufacturing an exemplary target 11 was about 398 kN on a pressing machine type MTS 810, 500 kN load frame with a MTS 458.20 micro control, and the pressing speed was 5 mm/s, for example.

Referring to FIG. 9A and FIG. 9B, there are illustrated the front face 7 and the back face 9 of an exemplary target support plate 4 for an embodiment of a target apparatus 900. The front face 7 of the target support plate 4 shows an elliptical target material receptacle 2 formed by the cavity C that includes the molybdenum target material on a gold-plated copper support 4 with the O-ring groove 6 positioned thereon. FIG. 9B shows the cooling channels 8 supported by aluminum strips therein generally indicated by the reference numeral 8a as a supporting material, for example, that desirably fill the cooling channels 8 to support the cooling channels 8 during formation of the molybdenum target 11. FIG. 9C shows the rear face 9 of another exemplary target apparatus 910 that includes the cooling channels 8 and the O-ring grooves 10 on an exemplary target support plate 4, such as includes copper. FIG. 9D shows the front face 7 of the exemplary target apparatus 910 that illustrates the molybdenum target 11 formed on the target support plate 4 with the target material receptacle 2 formed by the cavity C that includes the molybdenum target material. However, the front face 7 of the target apparatus 910 differs from the front face 7 of the target apparatus 900 in that the front face 7 of the target apparatus 910 has gold plated on the copper target support plate 4 with an O-ring 20 placed in association with the O-ring groove 6. In embodiments of target apparatuses, such as for the molybdenum target 11, the size, shape, dimensions and the geometry for the molybdenum target 11, the cooling channels 8, and the sealing O-ring grooves 6 and 10, and the corresponding O-rings 5 and 20 can depend on the particular use or application, and should not be construed in a limiting sense.

Continuing with reference to FIGS. 9A to 9D, the exemplary molybdenum targets 11 include about 160 mg to about 200 mg of Mo distributed in the target material receptacle 2 in the cavity C in a uniform or substantially uniform layer, such as in an elliptical shape, of about 10 mm×about 38 mm on the copper target support plate 4. In an alternate embodiment, the molybdenum target 11 can be of a generally circular shape as can be formed from a Mo pellet or disk with the diameter of 0.8 cm, for example. In such alternate embodiment, a molybdenum pellet or disk can be placed or embedded in the pre-formed or formed cavity C of the target material receptacle 2, as described, in approximately the center of a copper target support plate 4, such as of a generally disk shape, with a diameter of about 22 mm and a thickness of about 1.6 mm, for example.

In another exemplary embodiment, the target support plate 4, such as including copper, can be electroplated with gold or nickel to reduce copper oxide formation during post-processing with hydrogen peroxide or high temperature oxygen or ozone after irradiation. Referring to FIG. 9D, the exemplary target apparatus 910 can have the target copper support plate 4 being desirably gold plated or nickel plated, or can be electroplated with gold, platinum or other inert metal, such as selected from the group consisting of Iridium (Ir), Rhodium (Rh) and Osmium (Os), for example. Therefore, the protective or electroplated layer can be, but is not limited to, Gold (Au), Platinum (Pt), Iridium (Ir), Osmium (Os), Rhodium (Rh), Nickel (Ni), or a combination of thereof, for example.

Figure 10A:
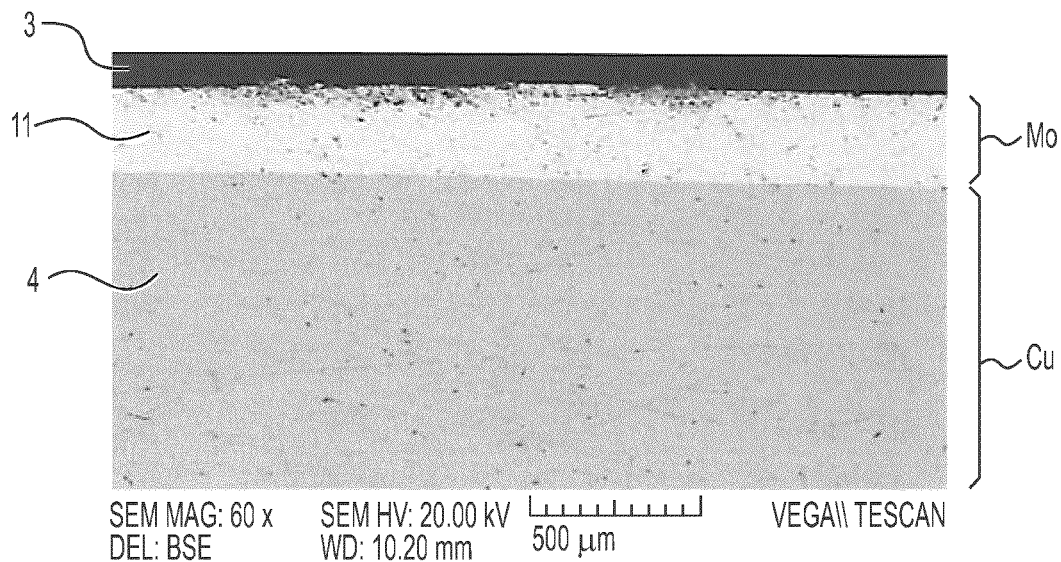
FIG. 10A and FIG. 10B are cross-sectional profiles of an exemplary molybdenum target taken with a Scanning Electron Microscope (SEM) according to the present invention.
Figure 10B:
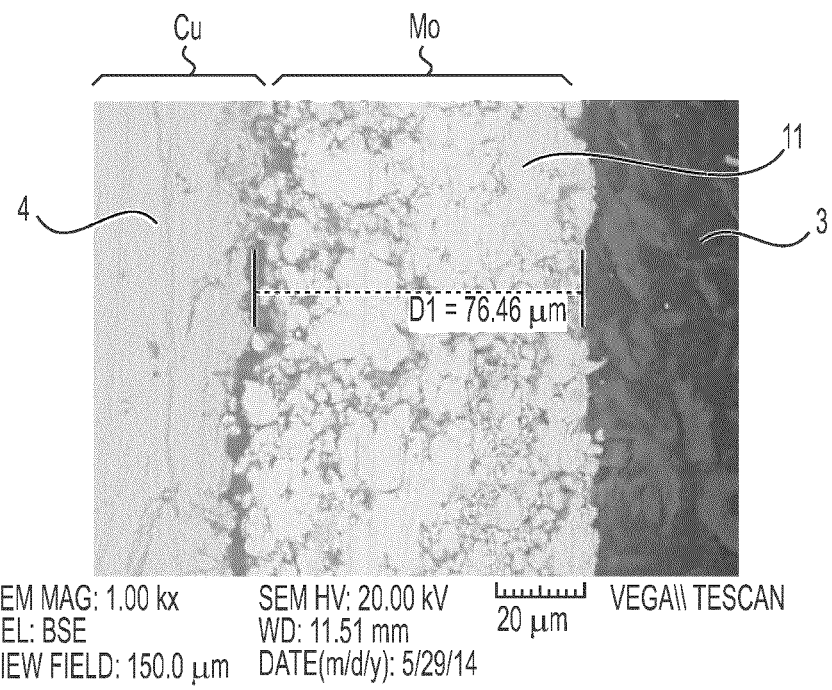

Referring now to FIG. 10A and FIG. 10B there are illustrated Scanning Electron Microscopy (SEM) cross-sectional profiles of an exemplary molybdenum target 11 having a compressed molybdenum layer as formed in the target material receptacle 2, such as the molybdenum target 11 of FIG. 2A. The molybdenum target 11 in the longitudinal cross sectional profile of FIG. 10A and in the transverse cross sectional profile of FIG. 10B illustrates a contrast layer 3 as a background for the molybdenum target 11 and shows a copper substrate as the target support plate 4, with the molybdenum being uniformly or substantially uniformly distributed and compacted without noticeable porosity. In FIGS. 10A and 10B, the molybdenum target layer 11 is molybdenum film (Mo) with a thickness of about 76 μm formed by pressing Mo powder with an exemplary force of about 400 kN, for example. The target support plate 4 illustrated corresponds to a copper (Cu) substrate. The density of the pressed deposited molybdenum layer is about 95% of the density of the base metal. The loss of molybdenum material during processing is typically about 2%, for example. The cross sectional profile of FIG. 10B taken with a Scanning Electron Microscope (SEM) indicates the thickness of the molybdenum layer forming the molybdenum target 11 attached to the copper target support plate 4.

In another embodiment, a process for the production of Tc-99m from a formed molybdenum target, such as from the formed molybdenum target 11 or 11a, as described, and the molybdenum target desirably including molybdenum-100, includes the steps of providing a molybdenum target, such as the formed molybdenum target 11 or 11a, to be irradiated. The formed molybdenum target, such as the formed molybdenum target 11 or 11a, is irradiated with a proton beam having an energy level, desirably greater than about 10 MeV, for example, to induce a Mo-100 (p, 2n) nuclear reaction. For example, the molybdenum target is exposed to a proton beam generated by a cyclotron at grazing incidence of about 15 degrees)(°, for example. Then, the irradiated molybdenum target, such as the irradiated molybdenum target 11 or 11a, is separated or extracted from the copper target support plate 4 or 4a by a suitable separation or extraction process to form a separated irradiated molybdenum material, such as by dissolution or dissolving the irradiated target 11 or 11a with hydrogen peroxide ($H_2O_2$), for example. Then, the separated irradiated molybdenum material is heated to a temperature in a range of from about 300° C. to about 1,200° C., desirably in a temperature range of from about 600° C. to about 850° C., for example, to generate a vaporized compound containing Tc-99m. Then the vaporized compound containing Tc-99m is condensed to form a reaction product. A base, desirably a dilute base, is added to the condensed reaction product to form a solution containing pertechnetate ion Tc-99m $[TcO_4]^-$. The condensed reaction product containing the solution of a pertechnetate ion Tc-99m $[TcO_4]^-$ is then collected. The Tc-99m $[TcO_4]^-$ pertechnetate solution from the condensed reaction product is then purified to provide the Tc-99m as a radiochemical compound, such as sodium pertechnetate ($NaTcO_4$) as the radiochemical compound, using column chromatography, or other suitable separation process, for example.

The resilience of the exemplary molybdenum target 11 was tested with various mechanical methods. An exemplary molybdenum target 11 manufactured with an applied force of about 400 kN survived thermal shock after being heated on a hot plate at about 550° C. for a period of about 30 seconds and then immersed in ice-cold water. The exemplary molybdenum target 11 was then dropped on a concrete floor from a distance of 1.5 m. No flaking or cracking was observed in the molybdenum layer forming the molybdenum target 11. A second test was performed by heating the exemplary molybdenum target 11 on a hot plate at 550° C. for about 1 minute and then exposing the back of the molybdenum target 11 to a laminar flow of cooling water at 17° C. for about 3 min. No flaking or cracking was observed in the Mo-layer forming the molybdenum target 11. A third test was performed in which the exemplary molybdenum target 11 was held at minus 30° C. for 5 days before heating to room temperature, and the molybdenum target 11 after heating to room temperature showed no visible signs of flaking or cracking of the Mo-layer.

An advantage of embodiments of the exemplary molybdenum target 11 is the enhancement of increased efficiency of direct production of Tc-99m by a medical cyclotron. The exemplary molybdenum target 11 can be relatively easily manufactured by a relatively simple industrial process with minimum losses of the target material. The distribution of a low amount of molybdenum in an elliptic print layer with the thickness calculated or determined to absorb energy equal to 15→10 MeV in the target molybdenum material can allow the use of the irradiating proton beam to maximize a number of nuclear reactions within a minimum amount of enriched target material. The gold plated copper target support plate 4 can provide an added advantage of increased heat dissipation while the inert passivation layer limits the amount of activation radionuclides in the process stream, such as $^{57}Co$, $^{63}Zn$, $^{67}Zn$, for example.

Embodiments of the exemplary process for forming the molybdenum targets 11 can overcome various difficulties that typically can be encountered by various known target formation processes. Adding a protective gold layer to a copper target support plate 4 can improve the target manufacturing process as compared with the known manufacturing processes for pressed, sintered and brazed Mo—Cu pellets or disks. In embodiments of the molybdenum target 11, gold can be advantageously used in conjunction with the target support plate 4, as described, in that it is chemically inert and can withstand the post-irradiation chemical processing which typically involves target dissolution with concentrated $H_2O_2$. Without the gold protective layer, during the target dissolution process, the concentrated solution of hydrogen peroxide would likely react with the copper target support and the concentrated solution of hydrogen peroxide can react with the copper target support plate 4 with the formation of Cu oxides and $Cu(OH)_2$ or other Cu(II) complexes in solution. The use of gold in conjunction with the target support plate 4 can assist in minimizing the formation of such Cu oxides and $Cu(OH)_2$ or other Cu(II) complexes in solution. Also, relatively high amounts of copper have been known to create further operational difficulties in known target forming processes.

Another advantage of embodiments of methods for forming molybdenum targets is the ability to eliminate a brazing step during the target manufacturing process. In contrast, in known target forming processes that use brazing, the composition of the high temperature brazing filler is typically based on a silver copper mixture. As such, in addition to a copper oxidation process, hydrogen peroxide is decomposed by minute amounts of silver with formation of silver peroxide. Both processes can contribute to chemical contamination of the mixture of irradiated material as can increase the operational difficulties, such as can be due to filter clogging, as recognized in the known art, or additional purification steps required to remove the chemical impurities, for example.

Additionally, irradiation testing has been performed on an embodiment of an exemplary circular molybdenum target for 30 minutes with a proton beam with energy of about 15 MeV. The power density on the exemplary circular molybdenum target was about 1.2 kW/$cm^2$. Subsequent successful irradiations of the exemplary circular molybdenum target have been made for 1 hr. with a proton beam at the energy of about 15 MeV having a power density of the exemplary target of about 1.0 kW/$cm^2$. The exemplary circular molybdenum target was successfully processed by dissolution with $H_2O_2$. The isotopic mixture with an activity of 4.5 Gigabecquerel (GBq) was transferred to a separation system. For the exemplary circular molybdenum target, Technetium isotopes have been isolated by a thermal separation technique. The gamma spectrometry analysis performed on a purified solution revealed only the presence of Tc isotopes (Tc-94, Tc-95 and Tc-96), and no activation products from the copper target support plate that included the exemplary circular molybdenum target have been identified in the purified product.

Also, an advantage, among others, in embodiments of the target manufacturing process can be achieved by direct pressing of molybdenum onto the copper substrate of the target support plate which can significantly reduce the manufacturing time by substantially eliminating a time-consuming step of a molybdenum sintering process or relatively long times typically required during the electrophoretic deposition on a tantalum support, thermo-compression or rolling and brazing on aluminum supports, for example.

Further, potential challenges encountered in manufacturing embodiments of molybdenum targets including the cooling channels and O-ring grooves have been addressed by manufacturing the cooling channels prior to pressing the molybdenum powder onto the target support plate with the cooling channels supported by a suitable material, such as aluminum or an aluminum material, desirably strong enough to withstand the pressure of about 150 kN/cm² deposited during the pressing process, for example.

As to supporting the cooling channels in embodiments of processes to form a molybdenum target, various methods and materials to support the cooling channels on the exemplary molybdenum target have been tried without relative success. These methods and materials include, but are not necessarily limited to: pressing the molybdenum powder onto a copper support placed on a steel die having a negative image of the cooling channels; filling cooling channels with Polyfilia and dissolving in water or diluted acid overnight; filling cooling channels with plaster of Paris and dissolving in water or diluted acid overnight. However, embodiments of methods of manufacturing the exemplary molybdenum targets that include supporting the cooling channels with aluminum strips during the pressing process have been found to yield the relatively best and acceptable results.

Further, the described embodiments of methods for forming a molybdenum target can provide a relatively low cost, reproducible, reliable and relatively rapid process for binding Mo powder on copper substrates to form cyclotron targets. The thickness of the Mo-100 layer is calculated or determined such that protons are absorbed with energy values of 15 MeV and 10 MeV, which is desirably in the range corresponding to relatively large values for the cross section for a Mo-100 (p, 2n) Tc-99m nuclear reaction. Commercial grade molybdenum powder typically can be used in forming embodiments of the molybdenum targets without special pre-processing, wherein the entire pre-processing and the process to fix the molybdenum to the copper can typically be done in a few seconds.

It is to be understood that the present invention is not limited to the embodiments described above, but encompasses any and all embodiments within the scope of the following claims.

We claim:

1. A target apparatus for forming a target for production of Tc-99m, comprising:
   a target support plate including copper having a front face and a back face, the front face having formed therein a cavity forming a target material receptacle configured to receive a molybdenum material to form a molybdenum target; and
   one or more cooling channels formed on the back face of the target support plate and having a removable supporting material comprising aluminum strips positioned in the one or more cooling channels configured to protect the one or more cooling channels during formation of the molybdenum target, the one or more cooling channels configured to cool the target support plate during formation of Tc-99m from the formed molybdenum target by a flow of a cooling fluid therein during irradiation of the molybdenum target to form the Tc-99m.

2. The target apparatus for forming a target for production of Tc-99m of claim 1, wherein
   a thickness of the target support plate is in the range of from about 2 millimeters to about 4 millimeters, and the target support plate has a length of about 65 millimeters and a width of about 30 millimeters.

3. The target apparatus for forming a target for production of Tc-99m of claim 1, wherein the formed cavity forming the target material receptacle on the front face of the target support plate has at least one of a generally circular shape or a generally elliptical shape.

4. The target apparatus for forming a target for production of Tc-99m of claim 1, further comprising:
   at least one sealing O-ring groove formed in at least one of a corresponding one or more of the front face and the back face of the target support plate, the at least one sealing O-ring groove capable of receiving a corresponding sealing O-ring to seal a corresponding one of a target face of the molybdenum target or to seal the back face and the one or more cooling channels when the target apparatus is placed in a target holder during irradiation of the molybdenum target to form the Tc-99m.

5. The target apparatus for forming a target for production of Tc-99m of claim 1, wherein the formed cavity forming the target material receptacle in the target support plate has a depth in a range of from about 200 microns to about 400 microns for receiving the molybdenum material, the molybdenum material including at least one of a molybdenum powder or a molybdenum disk.

6. The target apparatus for forming a target for production of Tc-99m of claim 1, wherein the one or more cooling channels are arranged in a longitudinal direction or a perpendicular direction on the back face of the target support plate relative to a length of the target support plate.

7. The target apparatus for forming a target for production of Tc-99m of claim 1, wherein the cooling fluid comprises water and the flow of the water to cool the target support plate during irradiation of the molybdenum target is in a range of from about 8 Liters/minute to about 10 Liters/minute.

8. The target apparatus for forming a target for production of Tc-99m of claim 1, wherein the one or more cooling channels in conjunction with the flow of the cooling fluid therein during irradiation of the molybdenum target to form the Tc-99m provide a temperature of the target support plate to be held to less than about 300 degrees Centigrade (° C.).

9. The target apparatus for forming a target for production of Tc-99m of claim 1, wherein the target support plate has a thickness in a range of from about 2 millimeters to about 4 millimeters.

10. The target apparatus for forming a target for production of Tc-99m of claim 1, wherein the target support plate has a length in a range of from about 50 millimeters to about 100 millimeters and has a breadth in a range of from about 20 millimeters to about 50 millimeters.

11. The target apparatus for forming a target for production of Tc-99m of claim 1, further comprising:
   a molybdenum target formed in the cavity forming the target material receptacle, the molybdenum material including at least one of a molybdenum powder or a molybdenum disk or pellet.

12. The target apparatus for forming a target for production of Tc-99m of claim 1, wherein the molybdenum material comprises Mo-100.

13. The target apparatus for forming a target for production of Tc-99m of claim 1, wherein the molybdenum material when embedded in the cavity forming the target material receptacle forms a thin layer with a thickness in a range of from about 50 microns to about 300 microns.

14. The target apparatus for forming a target for production of Tc-99m of claim 1, wherein at least the front face of the target support plate is electroplated with an inert metal selected from the group consisting of Gold (Au), Platinum (Pt), Iridium (Ir), Osmium (Os), Rhodium (Rh), Nickel (Ni), or a combination of thereof.

15. A method for manufacturing a target for the production of Tc-99m, comprising the steps of:

providing a target apparatus for forming a target for production of Tc-99m, comprising:
a target support plate including copper having a front face and a back face, the front face having formed therein a cavity forming a target material receptacle configured to receive a molybdenum material to form a molybdenum target; and
one or more cooling channels formed on the back face of the target support plate and having a removable supporting material comprising aluminum strips positioned in the one or more cooling channels configured to protect the one or more cooling channels during formation of the molybdenum target, the one or more cooling channels configured to cool the target support plate during formation of Tc-99m from the formed molybdenum target by a flow of a cooling fluid therein during irradiation of the molybdenum target to form the Tc-99m;
placing the molybdenum material in association with the front face of the target support plate in the cavity forming the target material receptacle; and
applying a pressing force to the molybdenum material to embed the molybdenum material in the cavity forming the target material receptacle for the molybdenum material, the pressing force creating a thin substantially uniform layer of the molybdenum material in the formed cavity of the target support plate to form a molybdenum target for forming Tc-99m.

16. The method for manufacturing a target for the production of Tc-99m of claim 15, wherein the molybdenum material comprises a molybdenum powder or a molybdenum disk or pellet.

17. The method for manufacturing a target for the production of Tc-99m of claim 16, wherein the thin substantially uniform layer of the molybdenum material has an elliptical or circular shape corresponding to a shape of a protrusion on a die forming the cavity.

18. The method for manufacturing a target for the production of Tc-99m of claim 16, wherein the molybdenum powder or the molybdenum disk or pellet is compressed by a die having a corresponding elliptic shaped protrusion or a corresponding circular shaped protrusion to produce the thin substantially uniform layer of the molybdenum material forming the molybdenum target of a corresponding shape.

19. The method for manufacturing a target for the production of Tc-99m of claim 15, wherein the thin substantially uniform layer of the molybdenum material has a thickness in the range of from about 50 microns to about 200 microns.

20. The method for manufacturing a target for the production of Tc-99m of claim 15, wherein the thin substantially uniform layer of the molybdenum material has a thickness in a range of from about 60 microns to about 80 microns.

21. The method for manufacturing a target for the production of Tc-99m of claim 15, wherein the applied pressing force is in a range of from about 100 kilo Newtons (kN) to about 500 kN.

22. The method for manufacturing a target for the production of Tc-99m of claim 15, further comprising the step of:
forming at least one sealing O-ring groove in at least one of a corresponding one or more of the front face and the back face of the target support plate, the at least one sealing O-ring groove adapted to receive a corresponding sealing O-ring to seal a corresponding one of a target face of the molybdenum target or to seal the back face and the one or more cooling channels during irradiation of the molybdenum target to form the Tc-99m.

23. The method for manufacturing a target for the production of Tc-99m of claim 15, wherein:
the aluminum strips are positioned in the one or more cooling channels to support the one or more cooling channels during application of the applied pressing force.

24. The method for manufacturing a target for the production of Tc-99m of claim 15, wherein the one or more cooling channels are adapted to provide for a flow of a cooling fluid to maintain a temperature of the target support plate at a temperature below about 300 degrees Centigrade (° C.) during irradiation of the molybdenum target to form the Tc-99m.

25. The method for manufacturing a target for the production of Tc-99m of claim 15, further comprising the step of:
electroplating at least the front face of the target support plate with an inert metal selected from the group consisting of Gold (Au), Platinum (Pt), Iridium (Ir), Osmium (Os), Rhodium (Rh), Nickel (Ni), or a combination of thereof.

26. The method for manufacturing a target for the production of Tc-99m of claim 15, wherein the molybdenum material comprises at least one of a molybdenum metal powder or a molybdenum disk that includes Mo-100.

27. A process for the production of Tc-99m, comprising the steps of:
providing a target apparatus for forming a target for production of Tc-99m, comprising:
a target support plate including copper having a front face and a back face, the front face having formed therein a cavity forming a target material receptacle configured to receive a molybdenum material to form a molybdenum target; and
one or more cooling channels formed on the back face of the target support plate and having a removable supporting material comprising aluminum strips positioned in the one or more cooling channels configured to protect the one or more cooling channels during formation of the molybdenum target, the one or more cooling channels configured to cool the target support plate during formation of Tc-99m from the formed molybdenum target by a flow of a cooling fluid therein during irradiation of the molybdenum target to form the Tc-99m;
providing the molybdenum target formed of the molybdenum material in the cavity forming the target material receptacle; and
irradiating the molybdenum target with a proton beam having an energy to induce a 100Mo (p, 2n) nuclear reaction in the molybdenum material of the molybdenum target to form the Tc-99m;
flowing the cooling fluid through the one or more cooling channels during the irradiating of the molybdenum target to provide a temperature of the target support plate to be held to less than about 300 degrees Centigrade (° C.);
separating the irradiated molybdenum target from the target support plate to form a separated irradiated molybdenum material which includes the formed Tc-99m;

heating the separated irradiated molybdenum material to a temperature in a range of from about 300° C. to about 1,200° C. to generate a vaporized compound containing the Tc-99m;

condensing the vaporized compound containing the Tc-99m to form a reaction product;

adding a base to the condensed reaction product to form a pertechnetate;

collecting the condensed reaction product containing the solution of a pertechnetate Tc-99m [TcO$_4$]$^-$; and purifying the Tc-99m [TcO$_4$]$^-$ pertechnetate solution from the condensed reaction product to provide the Tc-99m as a radiochemical compound.

28. The process for the production of Tc-99m of claim 27, wherein the energy of the proton beam irradiating the molybdenum target is greater than about 10 Megaelectronvolts (MeV).

29. The process for the production of Tc-99m of claim 27, wherein the molybdenum target is exposed to a proton beam generated by a cyclotron at grazing incidence of about 15 degrees (°).

30. The process for the production of Tc-99m of claim 27, wherein the molybdenum target comprises molybdenum-100, the radiochemical compound comprises Tc-99m sodium pertechnetate (NaTcO$_4$), and purifying the Tc-99m [TcO$_4$]$^-$ pertechnetate solution from the condensed reaction product includes using column chromatography.

31. The process for the production of Tc-99m of claim 27, wherein the separating the irradiated molybdenum target from the target support plate to form the separated irradiated molybdenum material comprises a dissolution process, and purifying the Tc-99m [TcO$_4$]$^-$ pertechnetate solution from the condensed reaction product includes using column chromatography.

32. A method for manufacturing a target for the production of Tc-99m, comprising the steps of:

providing a target apparatus for forming a target for production of Tc-99m, comprising:

a target support plate including copper having a front face and a back face, the front face having formed therein a cavity forming a target material receptacle configured to receive a molybdenum material to form a molybdenum target; and one or more cooling channels formed on the back face of the target support plate and having a removable supporting material comprising aluminum strips positioned in the one or more cooling channels configured to protect the one or more cooling channels during formation of the molybdenum target, the one or more cooling channels configured to cool the target support plate during formation of Tc-99m from the formed molybdenum target by a flow of a cooling fluid therein during irradiation of the molybdenum target to form the Tc-99m;

placing the molybdenum material in the cavity forming the target material receptacle on the target support plate; and applying a pressing force to the molybdenum material placed in the cavity of the target material receptacle on the target support plate to create a pressed thin substantially uniform layer of the molybdenum material in the cavity of the target support plate to form a molybdenum target to form Tc-99m.

33. A method for manufacturing a target for the production of Tc-99m, comprising the steps of:

providing a target apparatus for forming a target for production of Tc-99m, comprising:

a target support plate including copper having a front face and a back face, the front face having formed therein a cavity forming a target material receptacle configured to receive a molybdenum material to form a molybdenum target; and one or more cooling channels formed on the back face of the target support plate and having a removable supporting material comprising aluminum strips positioned in the one or more cooling channels configured to protect the one or more cooling channels during formation of the molybdenum target, the one or more cooling channels configured to cool the target support plate during formation of Tc-99m from the formed molybdenum target by a flow of a cooling fluid therein during irradiation of the molybdenum target to form the Tc-99m;

embedding the molybdenum material in the cavity forming the target material receptacle on a target support plate, the target support plate providing a physical support for the molybdenum target to be formed from the molybdenum material; and applying a pressing force on the molybdenum material embedded on the target support plate to create a pressed thin layer of the molybdenum material on the target support plate forming a molybdenum target to form Tc-99m.

* * * * *